Jan. 10, 1950     C. W. MORRISON     2,493,823
PROCESS FOR ZINC SMELTING
Filed April 2, 1947     3 Sheets-Sheet 3
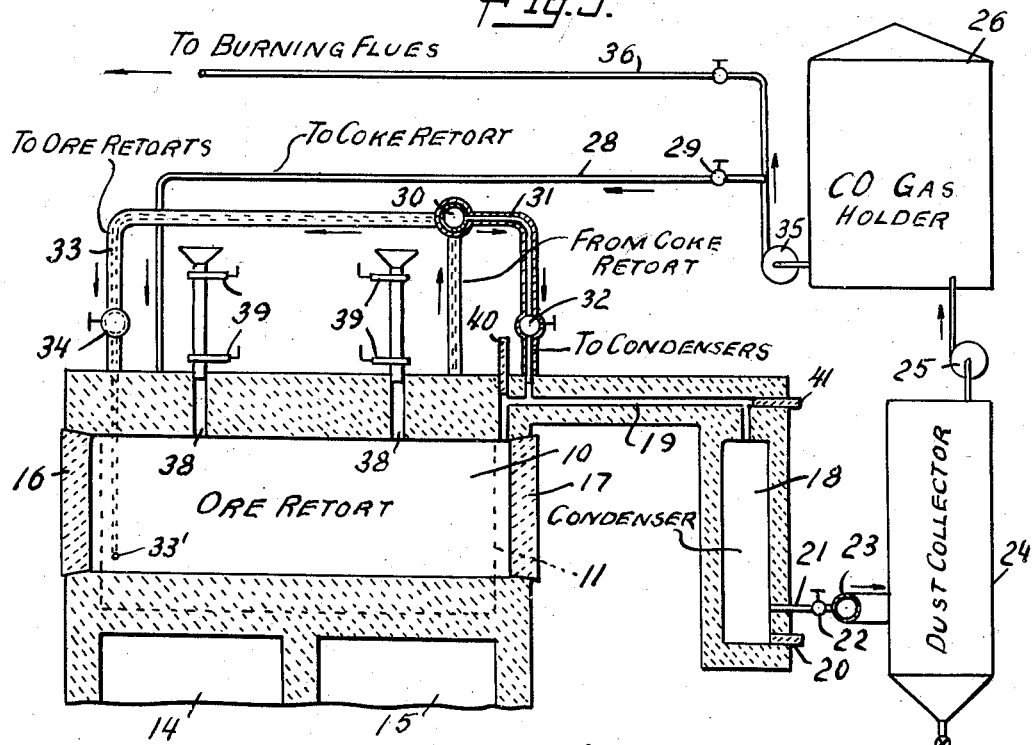
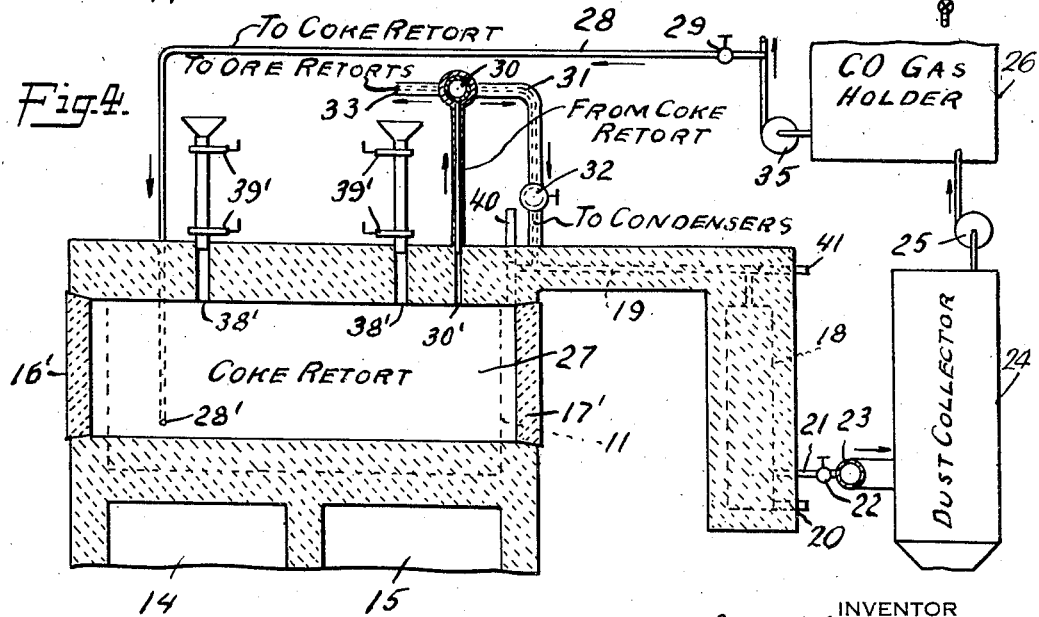

Patented Jan. 10, 1950

2,493,823

UNITED STATES PATENT OFFICE 2,493,823

PROCESS FOR ZINC SMELTING

Clyde W. Morrison, Bartlesville, Okla., assignor to National Zinc Company, Inc., New York, N. Y., a corporation of New York Application April 2, 1947, Serial No. 738,981

6 Claims. (Cl. 75—86)

This invention relates to zinc smelting and has for its object the provision of an improved method of smelting zinc ores and other suitable zinc-bearing materials, particularly for the production of slab zinc.

Slab zinc is commonly produced by heating and smelting a mixture of zinc oxide and carbon in a reaction chamber from which free oxygen and other oxidizing agents are excluded during the reaction period. The zinc oxide may be a constituent of roasted zinc concentrates, naturally oxidized zinc ores, by-products of metallurgical or chemical operations, or other suitable zinc-bearing materials. The carbon may be a constituent of coke, coal, charcoal or other suitable carbonaceous material. Zinc vapor and carbon monoxide gas are produced as the end products of the reaction, and are delivered to a condenser where the zinc vapor is condensed to molten zinc and the carbon monoxide exhausted or, if desired, recovered for subsequent use. The molten zinc is appropriately withdrawn from the condenser and cast into slabs.

In accordance with the present invention, zinc smelting is carried out in a battery of reaction chambers generally resembling any one of the present day types of by-product coke oven batteries or furnaces. Combustion chambers, heating flues and heat regenerators are operatively associated with the reaction chambers, as in a coke-oven battery. A zinc condenser is directly connected to each reaction chamber. The gas outlets of the condensers are connected to a dust and fume recovery unit, and a gas holder is provided for the collection and storage of carbon monoxide gas.

Figure 1:
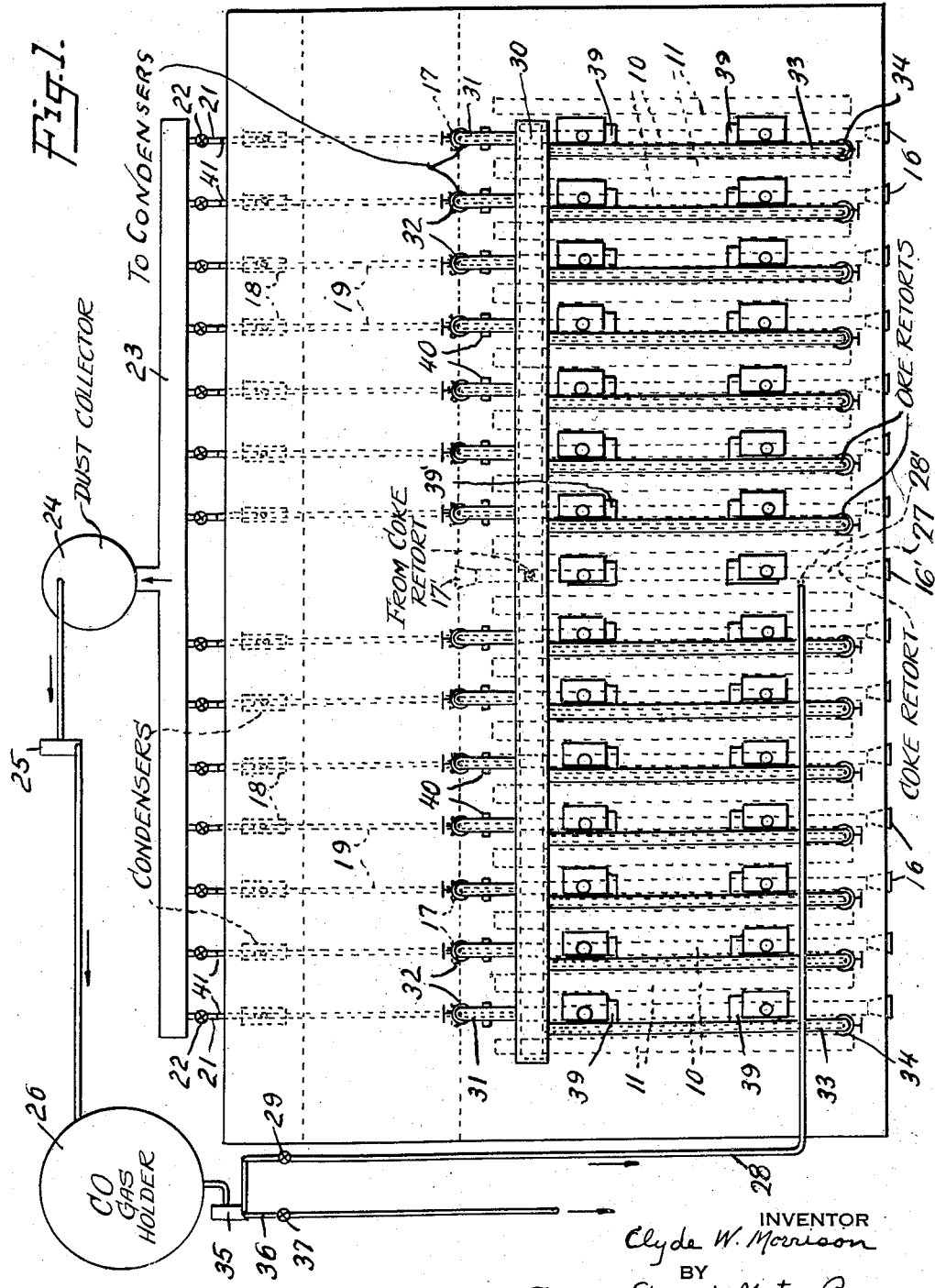
Figure 2:
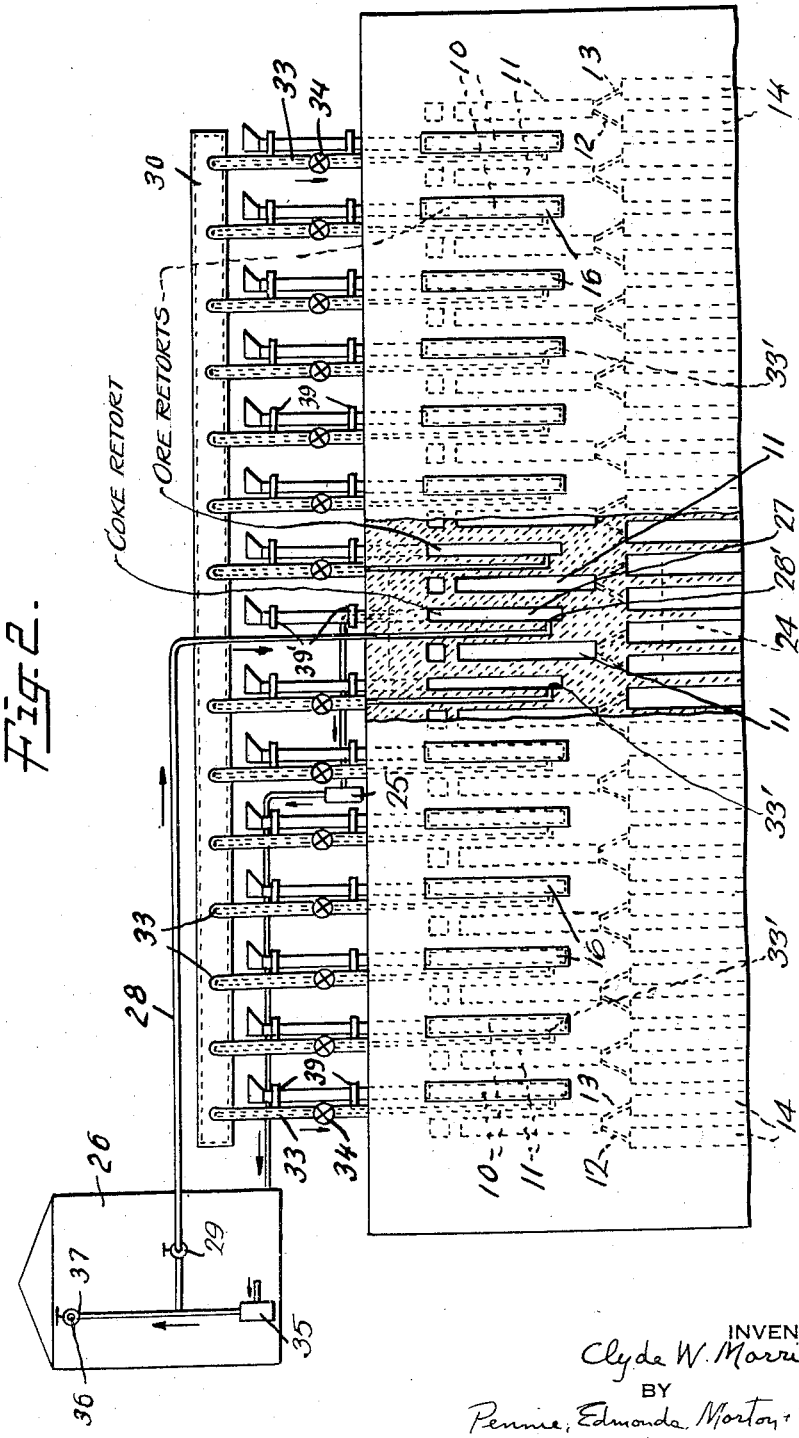

One of the novel features of the invention resides in passing hot carbon monoxide gas free of all or nearly all oxidizing constituents through each idle condenser during the periods that its retort is being discharged and recharged. Another novel feature resides in passing a substantial volume of such hot carbon monoxide gas through the charges undergoing smelting in the retorts, and preferably, from time to time during the smelting operation, adding granular carbonaceous material on top of the charges undergoing smelting. The hot carbon monoxide gas is derived from the condensers in which zinc vapor is condensed, and may be heated and freed of all or nearly all oxidizing constituents by passage through a body of highly heated coke in one of the retorts of the battery. These and other novel features of the invention will be best understood from the following description taken in conjunction with the accompanying drawings, in which Fig. 1 is a top plan, somewhat diagrammatic, of an apparatus for practicing the invention, Fig. 2 is a front elevation, partly in section, of the apparatus, Fig. 3 is a transverse sectional elevation, somewhat diagrammatic, through an ore retort or reaction chamber, and Fig. 4 is a transverse sectional elevation, similarly somewhat diagrammatic, through a coke retort.

The zinc smelting furnace illustrated in the drawings is constructed generally along the lines of a by-product coke oven battery, and has a plurality of externally-heated reaction chambers or retorts 10 in which the zinc ore or other zinc-bearing material is smelted, and the retorts are hence designated "ore retorts" on the accompanying drawings, and are hereinafter generally referred to as smelting retorts. Combustion or heating chambers 11 are arranged between the retorts 10. Preheated fuel gas and air are admitted to the bottom of each heating chamber 11 through ports 12 and 13, respectively. Heat regenerators 14 and 15 are operatively associated with the chambers 11, and are operated as customary for alternately absorbing heat from the exhaust gases from the chambers 11 and for preheating the fuel gas and air. The main structural features of the apparatus form no part of the invention except insofar as modified for practicing the zinc smelting method of the invention.

The smelting retorts 10 are generally rectangular in shape, and are provided with doors 16 and 17, one at each end. A zinc condenser 18 is directly connected to each retort 10 by a duct or flue 19, which may conveniently pass through the brickwork structure (Fig. 3). The condensers have upright rectangular condensing chambers, with a molten zinc tap-hole 20 at the bottom, and an outlet 21 for the exhaust gases, mainly carbon monoxide, a short distance above the bottom. Merely for purposes of illustration, the retorts 10 may be considered as about 40 feet long, 12 feet high and 15 inches wide, and the condensers 18 as about 4 feet long, 19 feet high and 15 inches wide, all inside dimensions. The battery of retorts 10 is built in a furnace structure of refractory and insulating brickwork with structural steel supports, like a conventional coke oven furnace; and the condensers are built of refractory and insulating material with such heat-dissipating characteristics as are required for economic condensation of zinc vapor within each condensing chamber.

The gas outlet 21 of each condenser is provided with a valve 22, and all the outlets are connected to a common flue or manifold 23 discharging into a dust chamber 24 or other suitable dust and fume recovery unit. The gas, mainly carbon monoxide, is drawn through the dust collector by a gas pump or fan 25 and delivered to a gas holder or storage tank 26. Arrows on the drawings indicate the direction of flow of carbon monoxide gas throughout the apparatus.

Included in each battery of smelting retorts 10 is one or more non-smelting retorts 27, which are charged and filled with coke, and hence called coke retorts (Fig. 4). The coke retorts are externally heated, like the smelting retorts, and are of the same dimensions, but are not connected to a condenser. Carbon monoxide gas, drawn from the gas holder 26 through a pipe 28 having a valve 29, enters the front end of each coke retort 27 through a port or ports 28' in the side wall or bottom thereof, and passing through the heated coke is deprived of all or nearly all oxidizing constituents and raised to a predetermined temperature. The resulting hot carbon monoxide gas passes through a port 30' in the roof near the rear of the coke retort to a heat-insulated distributing flue or pipe 30, from whence he gas is drawn, as required, through insulated pipes 31 having valves 32 into the ducts or flues 19 and thence through these ducts or flues into the condensers 18. Other insulated pipes 33 having valves 34 convey hot carbon monoxide gas from the distributing flue 30, through a port or ports 33' in the side wall or bottom of each smelting retort, into each smelting retort.

The carbon monoxide gas in the holder 26 may be maintained under sufficient pressure to force the gas through the coke retorts 27, distributing flue 30 etc., or a gas pump or fan 35 may be provided for that purpose. A pipe 36 having a valve 37 is also connected to the gas holder 26 for conveying carbon monoxide gas to the burning flues for the heating chambers 11. Under normal operating conditions, all of the carbon monoxide generated in the smelting operation is collected in the gas holder 26, and there is thus provided adequate carbon monoxide for introduction into the smelting retorts and condensers, as hereinafter described, and the excess carbon monoxide is available for delivery (through the pipe 36) to the fuel gas for firing the heating chambers 11.

Since the hot coke in the coke retort (or retorts) 27 is only consumed in removing by deoxidation any oxidizing constituents in the carbon monoxide gas, the actual consumption of coke in this retort is relatively small. From time to time, as required, fresh coke may be added to the retort through openings 38' in the top of the furnace structure. The coke is conveniently delivered to the charging openings in the top of the retort by double-gate chutes 39', of conventional construction, to prevent the escape of carbon monoxide gas. The coke retort may be cleaned of residual ash, when necessary, by removing the end doors 16' and 17' and pushing the ash out into a dump car or the like.

The battery of smelting retorts 10 operates as a whole in a substantially continuous manner, although smelting in each individual retort is an intermittent or batch operation. The retorts are charged through their top openings 38 with a mixture of zinc-bearing and carbonaceous materials. Sintered zinc ore containing about 70% zinc, along with skimmings blue powder and other by-products of the operation may constitute the zinc-bearing material. The sinter is preferably crushed to a particle size varying from one fourth inch to one inch. The carbonaceous material may be coke containing 80–85% fixed carbon and crushed to a particle size varying from one-eighth inch to one-half inch. The smelting mixture may consist of about 10 parts by weight of crushed coke and about 17 parts of crushed sinter and other zinc-bearing material. A dump car is employed for conveying the mixture from storage bins to the charging openings 38, and a leveling tool is used to level the mixture in the retorts and to suitably fill them. After a retort has been filled with the smelting mixture, the openings 38 are closed and sealed. During charging (and subsequent discharging) the valve 34 is closed, and when the retort is charged and the openings 38 sealed, the valve 34 is opened and hot carbon monoxide gas is introduced into the front end of the retort. With retorts of the size hereinbefore suggested, carbon monoxide gas may advantageously be introduced at the rate of from 25 to 150 cubic feet per minute (calculated at 0° C. and a pressure of 760 mm. mercury). More generally and in terms of the hot gas, the volume of hot carbon monoxide gas introduced into each smelting retort per minute may be from ⅛ to ¾ the volume of the retort.

The flow of carbon monoxide gas through the retort, as smelting progresses, accelerates, by convection gas currents, the transfer of heat from the heated walls of the retort to the interior of the smelting charge. The carbon monoxide further, by chemical reaction, accelerates the reduction of the zinc oxide in the charge. Additionally, the carbon monoxide substantially inhibits any reoxidation of the evolved zinc vapor, thus minimizing, if not entirely preventing, the production of troublesome blue powder in the condenser and the formation of accretions on the walls of the condenser and the duct leading thereto.

At specified intervals during the smelting operation, dry crushed coke preferably preheated is introduced into the retort through the top charging openings 38, the double-gate chutes 39 preventing the escape of carbon monoxide and zinc vapor during the charging of such coke. The added quantities of coke fill the space progressively vacated in the retort by the evolution of carbon monoxide and zinc vapor from the charge, and overlay the charge as it is worked-off. This overlying layer of hot coke is an additional protection against reoxidation of zinc vapor, and also serves to filter out objectionable fume whose entrance into the condenser might excessively contaminate the slab zinc product.

During the smelting operation in each retort, the zinc vapor and carbon monoxide gas evolved from the charge together with the carbon monoxide gas introduced through the pipe 33 pass through the duct 19 into the condenser where the zinc vapor is condensed to molten zinc and the carbon monoxide gas flows through the outlet 21 to the dust collector, etc. From time to time, or continuously, if desired, molten zinc is withdrawn through the tap-hole 20 of the condenser into a holding furnace or other appropriate reservoir of molten zinc, from whence it is withdrawn as desired for casting into slabs in molding machines or the like. The top wall of each condenser has an opening in alignment with the flue 19 and normally closed by a plug 41 for permitting access to the flue for cleaning, etc., when necessary. The furnace or battery of retorts is continuously fired as in by-product coke-oven practice. Natural gas, producer gas or other suitable gaseous fuel is used for firing, supplemented by carbon monoxide gas produced by the smelting reaction in the retorts.

The working-off of the charge in each retort may take around 24 hours. The charging and discharging of the individual retorts takes place in sequence over the working-off period, so as to maintain continuity of operation of the battery as a whole. When a retort is worked-off, that is when the smelting of the charge in that retort is concluded, the valve 34 is closed, and the valve 32 is opened to permit the flow of hot carbon monoxide gas from the pipe 31 through the duct 19 and the condenser during discharging and subsequent charging of the retort. At the same time a gate or valve 40 in the duct 19 is closed to prevent air or other oxidizing agent entering the duct and condenser during discharging and recharging of the retort. The gate 40 is positioned as near as practical to the inlet end of the duct 19, and the pipe 31 is connected to the duct as near as practical to the gate 40, in order to keep the duct, as well as the condenser, hot and free of oxidizing constituents. The doors 16 and 17 are removed, and the residue or worked-off charge is pushed out of the retort by a mechanical ram into a car. The residue, particularly where coke is added to the retort from time to time during smelting, contains a substantial amount of recoverable carbon, which may be separated from the residue for reuse in the smelting operation. The doors 16 and 17 are then replaced, and the retort recharged as hereinbefore described. The valve 34 is then opened and hot carbon monoxide gas begins to flow into the retort. During discharging and recharging, the retort continues to be externally heated by the adjacent heating chambers, and the highly heated retort and the hot carbon monoxide gas promptly brings the charge up to the smelting temperature of around 1100° C. Alternatively, the charge may be brought up to about the smelting temperature in the hot retort before opening the valve 34. Until the charge attains the smelting temperature, gases from the retort are bled out through the charging openings 38. When the charge in the retort reaches the smelting temperature, the gate 40 is raised to open the duct 19, the valve 32 is closed, and smelting progresses with condensation of zinc vapor and recovery of carbon monoxide as hereinbefore described.

The gaseous products of the smelting operation (zinc vapor and carbon monoxide) leave the retorts at about the smelting temperature (1050–1200° C.). For efficient condensation of zinc vapor, the condensers are maintained at an operating temperature of about 550° C. The necessary dissipation of heat from the condensers to maintain this operating temperature is attained by constructing the condensers of refractory material of good heat conductivity, and, if necessary, by artificial cooling. One of the important aspects of the present invention resides in maintaining within all of the condensers at all times a minimum temperature of around 550° C. and a non-oxidizing atmosphere, thereby inhibiting the formation of objectionable by-products, such as blue-powder, crusts and accretions, in the condensers and their connecting ducts and flues. Thus, in accordance with the invention, hot carbon monoxide gas flows through an idle condenser and its associated duct at a precisely controlled rate during the periods that its retort is being discharged, recharged and the charge brought up to the smelting temperature. The carbon monoxide gas is derived from the smelting operation, and is heated to near the smelting temperature (say about 10000° C.) and freed of all or nearly all oxidizing constituents by passage through the coke retort. The rate of flow of the hot gas through the idle condenser is controlled by the valve 32 to maintain the contemplated minimum temperature within that condenser. During the periods that a condenser is idle, any artificial cooling thereof is interrupted, and the normal operating heat dissipation of the condenser may, if desired, be further decreased by providing the condenser during such idle periods with temporary heat insulation, thereby lowering the rate of flow of the hot carbon monoxide gas required to maintain the contemplated minimum temperature within the condenser. The carbon monoxide gas passes out of the condenser through the outlet 21 (the tap-hole 20 being closed) into the flue 23 as in the normal operation of the condenser.

The furnace battery of retorts may include one or more coke retorts, depending upon the number of smelting retorts in the battery. The amount of carbon monoxide gas flowing through the coke retort (or retorts) is controlled by the valve 29 to meet the carbon monoxide requirements of the smelting retorts and the idle condenser (or condensers). This carbon monoxide gas, while it may fluctuate somewhat in amount from time to time, is in constant circulation through the smelting retorts, the idle condensers, dust collector, gas holder and coke retorts. None of this carbon monoxide gas is intentionally consumed in process, and hence, aside from the inevitable losses, its quantity remains substantially constant for all practical purposes. Thus, practically all of the carbon monoxide evolved in the course of the smelting operation is available as fuel for firing the heating chambers 11. The amount of carbon monoxide gas currently flowing to the burning flues is controlled by adjusting the valve 37.

I claim:

1. The improvement in smelting zinc-bearing material in a battery of externally heated retorts connected to individual zinc condensers in which the individual retorts are operated intermittently while the battery of retorts as a whole is continuously operated, which comprises closing the connection between a retort and its condenser and passing hot carbon monoxide gas through the condenser during the periods that the retort is being discharged, recharged and the charge brought up to smelting temperature.

2. The improvement in zinc smelting according to claim 1 in which the hot carbon monoxide gas is derived from the condensers in which zinc vapor is condensed and the gas is passed through highly heated coke in one of the externally heated retorts of the battery.

3. The improvement in smelting zinc-bearing material in a battery of externally heated retorts connected to individual zinc condensers in which the individual retorts are operated intermittently while the battery of retorts as a whole is continuously operated, which comprises maintaining an idle condenser, during the periods that its retort is being discharged and recharged, at approximately its operating temperature for condensing zinc vapor by continuously passing hot carbon monoxide gas through the condenser during such periods.

4. The improvement in smelting zinc-bearing material in a battery of externally heated retorts connected to individual zinc condensers in which the individual retorts are operated intermittently while the battery of retorts as a whole is continuously operated, which comprises maintaining an idle condenser, during the periods that its retort is being discharged and recharged, at approximately its operating temperature for condensing zinc vapor by passing carbon monoxide gas through highly heated coke and continuously passing the resulting hot carbon monoxide gas through the condenser during such periods.

5. The improvement in smelting zinc-bearing material in a battery of externally heated retorts conected to individual zinc condensers in which the individual retorts are operated intermittently while the battery of retorts as a whole is continuously operated, which comprises passing hot carbon monoxide gas through the charges undergoing smelting in the retorts, withdrawing such carbon monoxide gas from the retorts along with the gaseous products of the smelting operation, from time to time during the smelting operation adding granular carbonaceous material on top of the charge undergoing smelting in the retorts, and maintaining an idle condenser, during the periods that its retort is being discharged and recharged at approximately its operating temperature for condensing zinc vapor by continuously passing hot carbon monoxide gas through the condenser during such periods.

6. The improvement in zinc smelting according to claim 5 in which the hot carbon monoxide gas is derived from the condensers in which the zinc vapor is condensed and the gas is heated by passage through highly heated coke in one of the externally heated retorts of the battery.

CLYDE W. MORRISON.

REFERENCES CITED

The following references are of record in the file of this patent:

UNITED STATES PATENTS

| Number | Name | Date |
| --- | --- | --- |
| 383,202 | Westman | May 22, 1888 |
| 1,308,879 | Thomson | July 8, 1919 |
| 1,733,500 | Koppers | Oct. 29, 1929 |
| 1,815,260 | Kemmer | July 21, 1931 |
| 2,096,779 | Bartholomew et al. | Oct. 26, 1937 |